Fig. 1.

Inventor:
Raymond E. Morgan,
by [signature]
His Attorney.

April 13, 1954  R. E. MORGAN  2,675,518
MAGNETIC AMPLIFIER CIRCUIT
Filed Feb. 28, 1951  3 Sheets-Sheet 3

Inventor:
Raymond E. Morgan,
by Paul A. Frank
His Attorney.

Patented Apr. 13, 1954

2,675,518

UNITED STATES PATENT OFFICE 2,675,518

MAGNETIC AMPLIFIER CIRCUIT

Raymond E. Morgan, Scotia, N. Y., assignor to General Electric Company, a corporation of New York Application February 28, 1951, Serial No. 213,277

21 Claims. (Cl. 322—28)

My present application is a continuation in part of my copending application Serial Number 94,577, filed May 21, 1949, now abandoned, and relates to magnetic amplifiers, more particularly to magnetic amplifiers of the self-saturating core type. It is the principal object of my invention to provide an improved amplifier circuit utilizing this type of magnetic amplifier.

A further object of the invention is the provision of a magnetic amplifier circuit which may be used in a regulating system to provide sensitive response and close, accurate regulation.

Another object of the invention is to provide a magnetic amplifier circuit which is operable in either a voltage or a frequency regulating system to compensate for frequency variations in the energy source being regulated.

An additional object of the invention is to provide a versatile magnetic amplifier circuit well adapted for voltage or frequency regulation of dynamoelectric machines.

A still further object of the invention is the provision of a magnetic amplifier circuit which may be used in a generator voltage regulating system to compensate for distortion of the voltage wave of the generator.

In carrying out my invention in one form, I provide a magnetic amplifier comprising a three-legged saturable magnetic core having two load windings and two control windings wound thereon. Both control windings are positioned on the center leg in a manner such that the magnetomotive forces of the two windings oppose each other. The two load windings are located respectively on the outer legs of the core. The load windings are connected in alternate rectified circuit portions of a bridge type full-wave rectifier which is supplied from a suitable alternating current source. The unidirectional output current of the rectifier is responsive in magnitude to the difference in magnetomotive forces of the two control windings.

For a clearer and more complete understanding of my invention, reference should be had to the accompanying drawing, Fig. 1 of which is an electrical circuit diagram of a voltage regulating system for an alternating current generator in which my magnetic amplifier circuit is used, while Fig. 3 is an electrical circuit diagram of a frequency regulating circuit for a motor-generator combination, while

Figure 1:
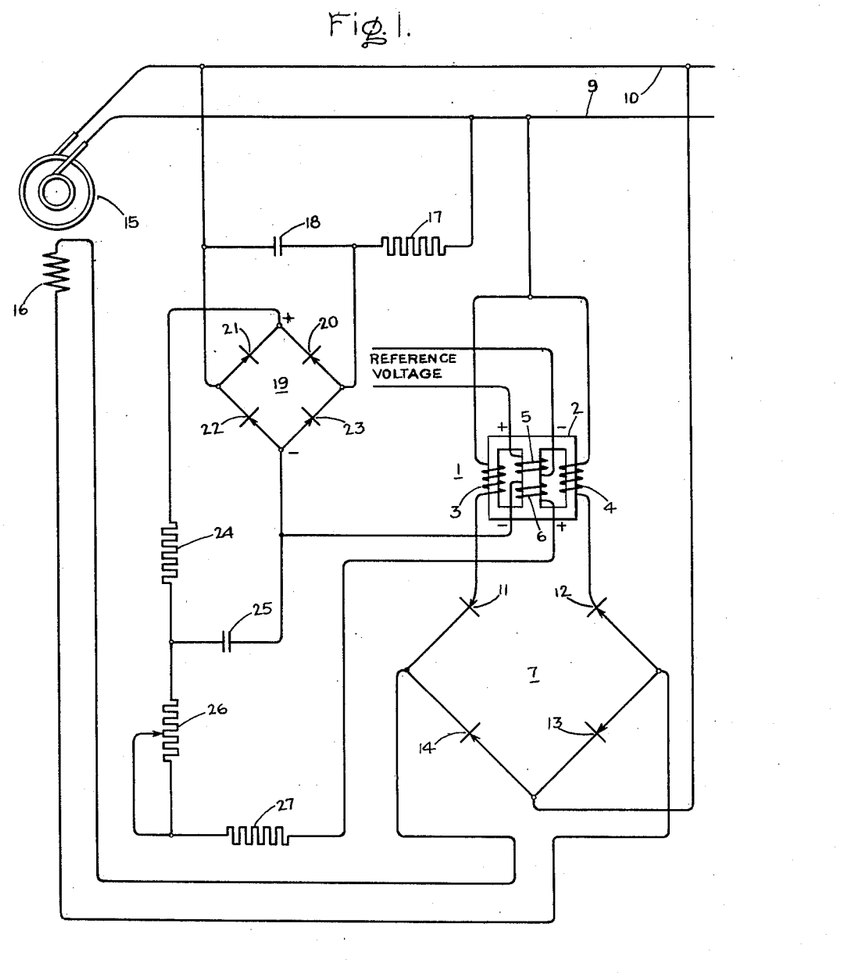

Referring to Fig. 1 of the drawing, there is shown a magnetic amplifier 1, of the self-saturating type, having a closed three-legged magnetic core 2, which is preferably of a material having a relatively high permeability. On the outer legs of core 2 are located load windings 3 and 4, respectively, while the center leg is equipped with two unidirectional current control windings 5 and 6. Load windings 3 and 4 are connected in circuit with a bridge type full-wave rectifier 7 to a source of alternating current electrical energy which supplies current through conductors 9 and 10. The operation of full-wave rectifier 7, which is composed of four unidirectional conducting devices 11, 12, 13 and 14, is explained in detail later. Load windings 3 and 4 are arranged on core 2 so that the unidirectional components of magnetic flux produced by current in the load windings 3 and 4 have the same direction, such as upward, in the outer legs and have the same mutually additive direction, such as downward, in the control winding containing center leg of core 2. Control windings 5 and 6 on the center leg of magnetic core 2 are connected so that the magnetomotive forces produced by these two windings oppose each other; the function of these windings is also explained in detail later.

Assume for the moment that load windings 3 and 4 of the magnetic amplifier are connected in circuit with rectifier 7 across the source of alternating current as shown in Fig. 1 and that control windings 5 and 6 are not energized. Under these circumstances, there will be no saturation of magnetic core 2 and, therefore, no flux in the core at the instant that the voltage wave of the alternating current supply rises from the negative portion of a cycle to zero. Then, as the voltage increases and begins a positive half cycle, the current in one load winding, for example, winding 3 produces flux in the magnetic core 2. This flux increases as the voltage increases during the positive half cycle in the manner similar to a transformer, reactor, or other such device. During the time that the flux is increasing, before the saturation point of the core is reached, substantially all of the voltage drop between conductors 9 and 10 occurs across load winding 3. But, as soon as the saturation point is reached, the current which is delivered in the load circuit is limited only by the air core inductance of load winding 3 and the impedance of the load itself. The core now being saturated, there is no longer any change in flux linkages to impede the flow of current through the load winding; therefore, the presence of the core no longer affects the reactance of the load winding. The current through the load winding lags slightly the phase of the alternating potential until this potential returns to zero at the end of the positive half of the cycle. When the voltage returns to zero, the rectifier stops the flow of current and during the next half cycle of voltage the flux returns to zero. During the next half cycle load winding 4 on the other outside leg of the amplifier core repeats the operation just described so that current flows through one load winding or the other during a portion of each half cycle.

Magnetic material having a magnetization curve with a very sharp knee is used for core 2. This causes the load current to rise from a negligible value to a maximum in approximately 5 electrical degrees of the alternating voltage cycle when the saturation point of the core is reached. For the remainder of each half cycle after saturation the load current follows approximately a sine wave. Thus, the magnetic amplifier has current characteristic curves very similar to those of a thyratron type electron discharge device.

It will be readily understood that when control windings 5 and 6 are energized with unidirectional current, the point during a voltage half cycle at which magnetic core 2 saturates will be changed. If the flux produced by the control winding is such that it opposes the flux produced by the load winding, the core saturates at a later point during the half cycle, which reduces the interval during which the load winding conducts current and, as a result, reduces the average load current. Conversely, if the control flux adds to the flux produced by the load winding, the core saturates earlier in the cycle and the load current is increased. In the typical application of my magnetic amplifier circuit herein described, it is necessary that the load current increase as a signal current decreases; therefore, two differentially connected control windings are used. Winding 5, which may be called the saturating winding, is connected to a source of reference potential and the polarity of winding 5 is such that the flux produced thereby adds to the flux produced by load windings 3 and 4. Control winding 6, which is connected to a source of signal current, is of opposite polarity so that the flux produced by this winding opposes the flux produced by winding 5 and thus comprises what may be termed as a "negative signal."

In the foregoing discussion, the hysteresis of magnetic core 2 was not discussed. Hysteresis is, of course, present but it does not alter the operation of the magnetic amplifier from that described. The amplifier is proportioned so that sufficient flux is supplied from one outside leg of the core when the load winding on that leg is conducting to the other outside leg to reduce the flux density in the latter leg below the negative knee of the magnetization curve. Therefore, all of the core traces the outer hysteresis loop, which means that the effects of the magnetomotive forces of the various load and control windings on the flux in the core are always uniform. It will be readily understood that other core shapes, such as torroidal, for example, may be used instead of the three-legged core illustrated in Fig. 1, as long as the magnetic interaction of the load and control windings remains substantially the same.

The magnetic amplifier 1 is shown in Fig. 1 as an element in a voltage regulating system for an alternating current generator 15. Generator 15 is illustrated as a single-phase machine having two output terminals to which conductors 9 and 10 are connected, with the excitation for the generator being supplied by an excitation coil 16. In the voltage regulating system, a resistor 17 and a capacitor 18 are connected in series between conductors 9 and 10. Connected in shunt with capacitor 18 is a conventional bridge type full-wave rectifier 19 composed of unidirectional conducting devices 20-23, inclusive. The pulsating unidirectional output current of rectifier 19 is of the polarity shown in Fig. 1. Because rectifier 19 is connected across capacitor 18, this pulsating current is shifted in phase with respect to the terminal voltage of generator 15 from the time relationship it would occupy if rectifier 19 were connected directly across conductors 9 and 10. The rectifier output current is lagging with respect to this voltage, with the amount of lag being determined by the relative impedances of resistor 17 and capacitor 18. The unidirectional current output of rectifier 19 is filtered by means of a filter composed of resistor 24 and capacitor 25. The filtered unidirectional current then flows through a variable resistor 26 and a series potential dropping resistor 27 and energizes control winding 6 on the magnetic amplifier.

In the operation of the voltage regulating system, if a drop occurs in the terminal voltage of generator 15, the potential between conductors 9 and 10 is reduced. This reduces the potential drop across resistor 17 and capacitor 18 and the potential drop across the latter reduces the unidirectional current output of rectifier 19. This reduces the current flowing in control winding 6 of the magnetic amplifier, which increases the control flux in core 2 inasmuch as the control winding 6 opposes the saturating control winding 5. The magnetomotive force of winding 5 is always larger than the difference of the magnetomotive forces of windings 5 and 6, the effect of a change in the current through winding 6 being to change inversely the net control flux produced by winding 5. The increase in control flux in core 2 causes the core to saturate earlier in each voltage half cycle which increases the average current output of load windings 3 and 4. This increases the load current through rectifier 7, which rectifier has the excitation circuit 16 of the generator connected between the unidirectional current output terminals thereof. The increase in current through excitation circuit 16 increases the terminal voltage of generator 15, and this increasing action is continued by the regulating system until the generator voltage is restored to the desired value. The generator voltage which the regulating system maintains is adjustable by varying resistor 26 to adjust the relative value of signal current which flows through control winding 6.

It will be readily understood that the current output of rectifier 19 is pulsating even though it is undirectional. The output current wave contains a ripple, the magnitude of which is determined by the relative sizes of the elements which are used in the filter—namely, resistor 24 and capacitor 25. In most instances, such a ripple is undesirable, but in this case it is used to increase the sensitivity of the voltage regulating system.

Figure 2:
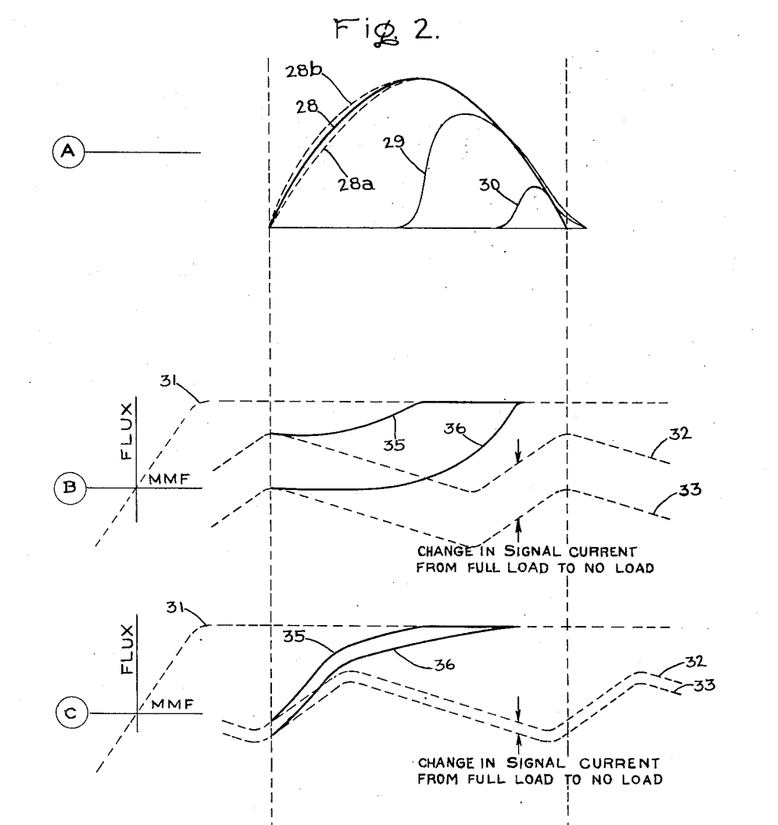
Fig. 2 illustrates, by means of curves how the magnetic amplifier, in conjunction with phase shifting means in the voltage regulating system, improves the sensitivity and accuracy of regulation.

The manner in which this is accomplished is illustrated by Fig. 2 of the drawing.

Referring to Fig. 2 of the drawing, there is shown in part A a curve 28 which represents the positive half of a voltage wave of the generator terminal voltage. Curves 29 and 30 represent, respectively, the maximum and minimum voltages across excitation coil 16 which are necessary to produce sufficient excitation flux to regulate the generator voltage between maximum generator load and no load. The saturation curve of the magnetic amplifier 1 is represented by curve 31 in parts B and C of Fig. 2. The control flux in the core of the magnetic amplifier which results from the difference in magnetomotive forces of control windings 5 and 6 is represented by curves 32 and 33 in parts B and C. Curve 32 represents the control flux at full load on the generator while curve 33 represents the control flux with no load on the generator, these curves corresponding respectively to excitation voltage curves 29 and 30. It will be noted that the control flux is pulsating because the current in control winding 6 which contributes to the net control flux is pulsating. The flux component produced by the load windings is combined with the flux produced by the control windings to arrive at the total flux in the core of the amplifier. This total flux is represented by curves 35 and 36, respectively, for full load generator and for no load on the generator.

It can be seen in part B of Fig. 2 that there is a relatively large difference in magnitude between curves 32 and 33. This difference in magnitude represents the change which the signal current in control winding 6 must undergo to maintain the generator voltage at a selected value as the generator load is changed from full load to no load. This is true because the control flux in the core of the amplifier is inversely proportional to the current in control winding 6 as long as the core is not saturated. The curves of part B would apply if the phase shifting circuit composed of resistor 17 and capacitor 18 were eliminated from the regulating system and rectifier 19 were connected directly to the generator terminal conductors. With the phase shifting circuit included, however, the phase of the pulsating signal current produced by rectifier 19 is shifted with respect to the voltage wave 28, as illustrated in part C. Because of this phase shift, the difference in magnitude between curves 32 and 33 is relatively small which means that a correspondingly small change in signal current through control winding 6 is required to effect regulation of the generator voltage from full to no load. In one typical voltage regulating system embodying my invention, I have found that it is possible, because of this feature, to reduce the voltage regulation to less than 1% where the percentage regulation is defined as $$\frac{(\text{No load voltage} - \text{full load voltage})}{\text{Full load voltage}} \times 100$$

Another feature of my invention, when used in a generator voltage regulating system as illustrated in Fig. 1, is its frequency compensation characteristics. If the frequency of generator 15 increases, for example, either concurrently with the terminal voltage, or separately, the capacitive reactance of capacitor 18 is reduced, which increases the amount of phase shift imparted to the signal current, thus retarding the time relationship of the flux component in the magnetic amplifier due to the control windings. In addition, the reduction in reactance of capacitor 18 reduces the amount of signal current, thereby increasing the net saturating flux produced by the control windings. Simultaneously, however, the increase in generator frequency increases the inductive reactance of load windings 3 and 4 of the magnetic amplifier which retards the time relationship of the flux component produced in the magnetic amplifier by these windings and decreases the current through these windings. The increase in flux and the shift in phase thereof due to the change in signal current tends to compensate for the decrease in flux and shift in phase thereof due to the change in load current. By properly proportioning the reactances of capacitor 18 and load windings 3 and 4, the voltage regulating system can be made to compensate completely for small frequency variations of generator 15. In fact, the regulating system can be made to have a negative voltage regulation for frequency changes if this is desired, and such over-regulation is often desirable in a generator voltage regulator to compensate for load changes which result from changes in the frequency. I have found in one typical generator voltage regulating system embodying my invention, which was constructed to provide exact frequency compensation, that the voltage regulation by this system is substantially independent of frequency over a range of 15% above to 15% below the normal frequency.

Another feature of my invention, when used in a generator voltage regulating system, is that it compensates for voltage distortion in the generator. It is well known that when a generator supplies an inductive load, the leading edge of the voltage wave may be distorted, as illustrated by dotted line 28a in Fig. 2. Also, in the more unusual case when the generator is supplying a capacitive load, the leading edge of the voltage wave may be distorted in the other direction, as illustrated by dotted curve 28b. The voltage regulating system illustrated in Fig. 1 compensates for both types of distortion because the reactances of capacitor 18 and load windings 3 and 4 are each changed by such distortion and these changes compensate for each other in a manner similar to that just described for frequency variation. If the voltage wave is distorted due to inductance, as illustrated by curve 28a, the reactance of capacitor 18 is decreased and the reactance of load windings 3 and 4 is increased; thus, the changes tend to compensate for each other, and if the elements of the system are properly proportioned, they compensate for each other completely. If distortion such as that illustrated by curve 28b occurs, the reactance of capacitor 18 is increased and that of load windings 3 and 4 is decreased, so that they still compensate for each other.

In order for a self-saturating magnetic amplifier to operate successfully, the current through the load windings must cease during every cycle. This gives my magnetic amplifier an advantage over a conventional bi-phase magnetic amplifier when used in a voltage regulating system, as illustrated here. When the magnetic amplifier is supplying a highly inductive load such as excitation coil 16, the interruption of current in the load windings of the amplifier may be prevented by the negative voltage generated by the inductive load during the off portion of the rectifier cycle, which tends to maintain the current in the load windings during this portion of the cycle. The use of a bridge type circuit, as illustrated by rectifier 7, bypasses the inductive current through rectifiers 13 and 14. This prevents the inductive current from flowing through the load windings 3 and 4 of the magnetic amplifier and thus permits the current in these windings to drop to zero during each cycle.

While I have illustrated a magnetic amplifier having two control windings connected with opposing polarities, it will be readily understood that a single control winding can be used without changing the principle of operation. In the system just described it was desired to provide a load current which increased as the signal current decreased, which made it necessary to use the differential arrangement illustrated. However, if it is desired to have the load current increase as the signal current increases, then control winding 5 may be omitted and control winding 6 used directly to operate the magnetic amplifier.

Figure 3:
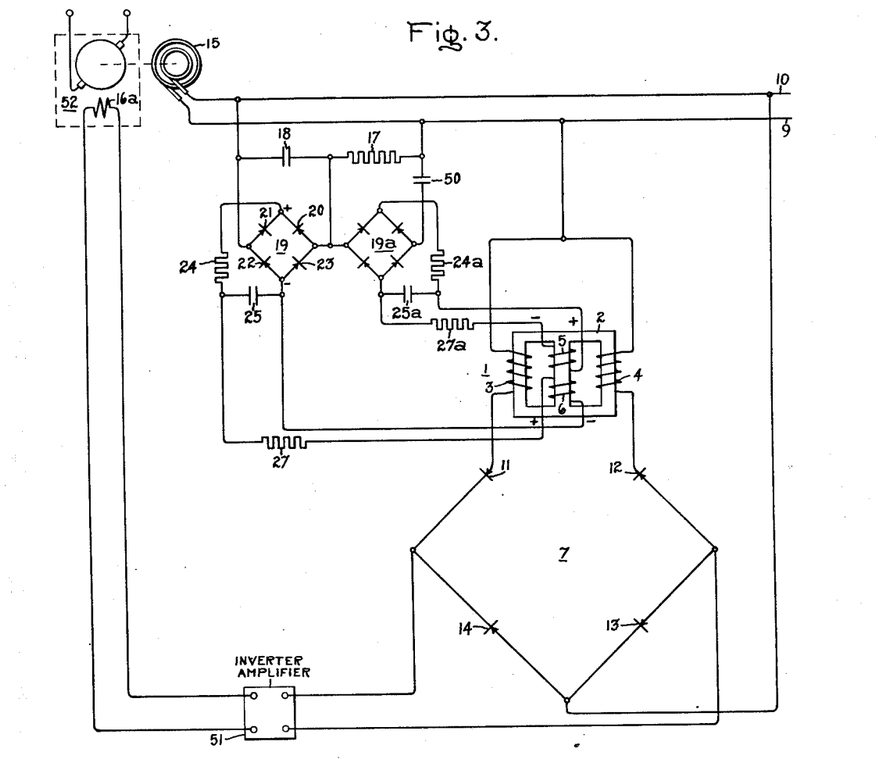

Referring now to Fig. 3, I have shown my invention as applied to control the frequency of an alternating voltage output of a motor-generator combination, such as commonly called an "inverter." If only a moderate degree of frequency regulation or speed of response is desired, a circuit similar to that shown in Fig. 1 may be used with the output of the magnetic amplifier 1 connected through an inverting stage of amplification to energize a speed controlling field of the motor rather than a voltage controlling field of the generator. If very close frequency regulation and extremely fast response is required, however, the modified circuit of Fig. 3 may be employed.

In Fig. 3, control winding 5, which in Fig. 1 was connected to a reference voltage, is now connected to receive a rectified and partially filtered voltage derived from a voltage developed across resistor 17. The circuit for supplying this rectified and partially filtered voltage to winding 5, is substantially identical with the previously described circuit, also included in the circuit of Fig. 3, for delivering to control winding 6 a rectified and partially filtered voltage derived from the voltage across capacitor 18. Similar components have, therefore, been designated in Fig. 3 by the same numeral followed by a distinguishing letter "a." Bridge rectifier 19a is connected in shunt with resistor 17 through an additional phase shifting capacitor 50, and supplies a pulsating unidirectional signal to control winding 5 through a potential dropping resistor 27a and a filter network comprising resistor 24a and a capacitor 25a. The remainder of the circuit of Fig. 3 is the same as that of Fig 1 with the exceptions that voltage adjusting resistor 26 is preferably omitted, and the output of magnetic amplifier 1 is supplied through an inverting stage of amplification, designated by block 51, to a speed controlling field winding 16a of a D. C. motor 52 instead of the generator voltage controlling field winding 16 of Fig. 1. Motor 52 is mechanically connected to drive generator 15 and thus to control the frequency of the alternating voltage output of generator 15. Current inverting amplifier 51 may be any suitable electronic or magnetic type and preferably comprises an additional stage of magnetic amplification similar to magnetic amplifier 1 in which the polarity of the control windings 5 and 6 are such to produce a decrease in the output current of inverting amplifier 51 with an increase in the signal current supplied to control windings thereof.

The operation of the circuit of Fig. 3 is similar to that described above in connection with the circuit of Fig. 1, but a much greater change in the current output of magnetic amplifier 1 is effected for a given frequency deviation of the alternator output voltage. This is due to the "push-pull" action of the respective unidirectional pulsating currents supplied to control windings 5 and 6. The polarity of rectifiers 19 and 19a and their manner of connection to control windings 5 and 6 are such that control winding 6 now receives unidirectional current in a "positive signal" direction to produce flux which aids the saturation of core 2 by load windings 3 and 4; while control winding 6 receives unidirectional current in a "negative signal" direction to produce flux which opposes core saturation. As explained above, capacitor 18 and resistor 17 comprise a phase shifting circuit such that the current through capacitor 18, and consequently the voltage across resistor 17, leads the impressed alternating voltage derived from lines 9 and 10. The phase of the voltage across capacitor 18 will, therefore, lag the generator voltage; and since capacitor 18 is connected in shunt with the unidirectional pulsating current supplied to control winding 6, this unidirectional pulsating current will also lag the phase of the generator output voltage. Consequently, the time phase of flux component in core 2 due to the control winding 6 will initially lag the time phase of the load winding flux components therein, with the amount of this lag in phase determined primarily by the capacitive reactance of capacitor 18 at the desired operating frequency.

Since the unidirectional pulsating current supplied to control winding 5 is derived from the voltage developed across resistor 17, this negative signal unidirectional current will have a time phase that leads the phase of the generator output voltage to produce a control winding 5 flux component in core 2 which leads the flux components due to load windings 3 and 4. This phase shift in a leading direction of the signal supplied to control winding 5, is augmented by the phase shifting action of the additional capacitor 50 and is preferably adjusted to be such that the total phase shift in a leading direction of the signal supplied to control winding 5 is equal to 180° minus the phase shift in a lagging direction of the signal supplied to control winding 6. Thus, the positive signal supplied to control winding 6 and the negative signal supplied to control winding 5 during each alternation of generator 15 voltage are substantially in phase. A preferred operating condition for the circuit of Fig. 3 is with the flux component in core 2 due to the positive signal current in winding 6 lagging the load winding flux component by approximately 60° at the desired operating frequency, while the flux component in core 2 due to the negative signal current in winding 5 is leading the load winding flux component by approximately 120°.

If, under these operating conditions, the frequency of the voltage output of generator 15 tends to decrease, two main effects result. First, the capacitive reactance of capacitor 18 increases to increase the amplitude of the current flowing through control winding 6 and to correspondingly reduce the amplitude of the current flowing through control winding 5. Secondly, the time phase of the flux component due to the positive signal in control winding 6, is shifted in a leading direction to an angle less lagging relative to the generator voltage and consequently to the load winding flux components. The negative signal current through control winding 5 is also shifted to a more leading phase angle.

It has been found that a positive signal has greatest effect upon magnetic amplifier 1 when it lags the power supplying voltage approximately 20°, while a negative signal has greatest effect upon the magnetic amplifier 1 when it lags the power supplying voltage approximately 75°. The positive signal supplied to control winding 6 is thus shifted to a position of greater effect upon the magnetic amplifier 1, while the negative signal supplied to control winding 5 is shifted to a position of less effect. Since an increase in the effect of a positive signal indicates an acceleration in the time of saturation of core 2, while a decrease in the effect of a negative signal also indicates an acceleration in the time of saturation of core 2, it is evident that both the amplitude change and the phase shift of the signals supplied to control windings 5 and 6 with a decrease in frequency will all be in a proper direction to increase the output of magnetic amplifier 1. An increase in frequency will, of course, produce an opposite amplitude change and direction of phase displacement of the control winding signals to reduce the output of magnetic amplifier 1 in the same manner.

Presuming a decrease in frequency, the resulting increase in the output current of magnetic amplifier 1 is amplified and inverted by inverter amplifier 51 to produce a corresponding decrease in the energizing current through speed controlling field winding 16a. Since, with a direct current motor, a decrease in strength of the speed controlling field produces an increase in speed of the motor, generator 15 will be driven at a greater speed to compensate for the initial tendency of the output voltage of generator 15 to decrease in frequency.

Figure 4:
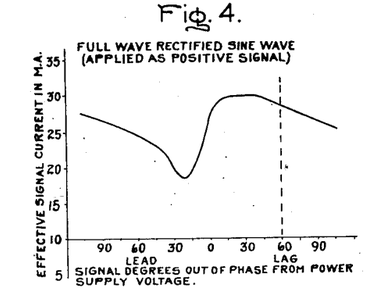
Figs. 4 and 5 are curves representing the effect upon the magnetic amplifier of shift in phase of positive and negative signals relative to the phase of the power supplying voltage thereof.
Figure 5:
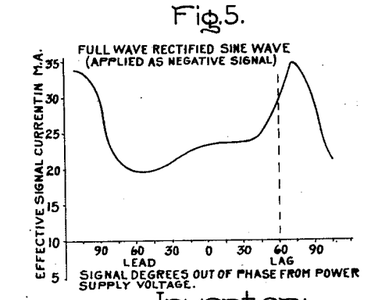

The above-described phase-shifting effects are clearly shown in the curves of Figs. 4 and 5. In Fig. 4, I have shown the effect of a shift in phase of a constant amplitude positive rectified sine wave signal relative to the phase of a magnetic amplifier power supplying voltage; while in Fig. 5 I have shown the effect upon the magnetic amplifier of a shift in phase of a constant amplitude negative rectified sine wave signal. Presuming that capacitor 18 and resistor 17 are so proportioned as to produce an initial lag of the positive signal through control winding 6 in the neighborhood of 60° and a lead in the phase angle of the negative signal supplied to control winding of approximately 120°, it will be seen that a shift in phase of both signals in a leading direction will cause the positive signal to move to a position of greater effect and the negative signal to move to a position of less effect. Since a positive signal tends to accelerate saturation of core 2 while a negative signal tends to retard the saturation thereof, it will be readily appreciated that a push-pull action results to produce a marked increase in magnetic amplifier output. Changes in frequency in an opposite direction, of course, produce an opposite push-pull effect. In operation, it has been found preferable that the signals in control windings 5 and 6 be maintained substantially in phase with each other as explained above and between 45° and 75° lagging relative to the power supplying voltage.

Although I have only shown certain embodiments of my invention, many modifications may be made. Rectifiers 11 and 12, for example, may be connected in series relation with load windings 3 and 4, respectively, on the opposite side of load windings 3 and 4 from rectifiers 14 and 13 rather than on the same side thereof as shown in the drawings. It is to be understood, therefore, that I intend by the appended claims to cover all such modifications as fall within the true spirit and scope of my invention.

What I claim as new and desire to secure by Letters Patent of the United States is:

1. A magnetic amplifier circuit comprising a source of alternating current, phase shifting means connected to said source, rectifier means connected to said phase shifting means for deriving a pulsating unidirectional current, a saturable magnetic core having positioned thereon two load windings and at least one control winding, said control winding being connected to be energized by said pulsating unidirectional current, and a bridge type full-wave rectifier connected to said source having said load windings connected in the alternate rectified circuit portions thereof, the unidirectional current output of said bridge type rectifier being responsive to variations in said pulsating unidirectional current whereby it is also responsive to variations in the voltage of said alternating current source.

2. A magnetic amplifier circuit comprising a source of alternating current electrical energy, a resistor and a capacitor connected in series to said source, a full-wave rectifier having two unidirectional current output terminals connected in shunt with said capacitor, a magnetic amplifier having a three-legged magnetic core, two load windings positioned respectively on the two outer legs of said core and two control windings positioned on the center leg of said core, the output terminals of said rectifier being connected to a first one of said control windings, a source of unidirectional reference voltage to which the second control winding is connected so that the flux produced thereby in the magnetic core of the amplifier is in phase opposition to the flux produced by said first control winding, and a second full-wave rectifier connected to said source of alternating current, said second rectifier having alternate rectified circuit portions for allowing current to pass in opposite directions therethrough from said source, unidirectional current output terminals comprising midpoints in said parallel circuits across which there is normally zero alternating potential, both such parallel circuits containing a half-wave rectifier in the portion on either side of the midpoint, and one said parallel circuit including one of the load windings of said magnetic amplifier in the portion on either side of the midpoint, and a current consumption device connected between the output terminals of said second full-wave rectifier, the current in said device being responsive to relative variations in the currents in said first and second control windings.

3. A magnetic amplifier circuit comprising, a self-saturating magnetic amplifier having a magnetic core, two load windings and two control windings, a variable potential source of alternating potential electrical energy, phase shifting means connected to said source comprising a resistor and a capacitor in series, rectifying means connected in shunt to said capacitor for deriving a pulsating unidirectional current of shifted phase responsive to the potential of said source, filter means connected to said rectifying means comprising a second resistor and a second capacitor, said filter means being connected to a first one of said control windings whereby the filtered pulsating unidirectional output current of said rectifying means energizes said first control winding, a source of unidirectional reference potential connected to the second control winding with opposite polarity to the said first control winding whereby a control flux is produced in the core of said amplifier which is responsive to the difference in magnetomotive forces of said control windings, a bridge type full-wave rectifier comprising four unidirectional conducting devices connected in pairs across said alternating potential source in a manner such that the midpoints of said pairs form unidirectional current output terminals equipotential to the fundamental wave of said source, said load windings being connected respectively in two of the legs of said bridge circuit which are joined to a common terminal of said alternating potential source, and a unidirectional current consumption device connected to the output terminals of said bridge type rectifier, the current in said device being responsive to the difference in magnetomotive forces of said control windings whereby it is also responsive to variations in said alternating potential source.

4. A magnetic amplifier circuit comprising a saturable magnetic core having a control winding and two load windings thereon, a source of alternating current electrical energy, phase shifting means connected to said source comprising a resistor and a capacitor in series, rectifying means connected in shunt with said capacitor for deriving from said alternating current a pulsating unidirectional current which is shifted in phase from said alternating current, filter means connected to said rectifying means comprising a second resistor and a second capacitor, said control winding being connected to said filter means and said rectifying means whereby the filtered pulsating unidirectional output current of said rectifying means energizes said control winding, an adjustable resistor connected in circuit with said control winding for adjusting the magnitude of the current in said control winding, a bridge type full-wave rectifier connected to said source having said load windings connected in alternate rectified circuit portions thereof, and a unidirectional current consumption device connected to said bridge type rectifier.

5. A voltage regulating system for an alternating current generator having a unidirectional current excitation circuit comprising, phase shifting means including a resistor and a capacitor connected to the output terminals of said generator, rectifier means connected in shunt to said capacitor for deriving a pulsating unidirectional current responsive to the output voltage of said generator and shifted in phase therefrom, filter means connected to said rectifier means for filtering said pulsating unidirectional current, a self-saturating magnetic amplifier having two load windings and two control windings on a common magnetic core, said control windings being connected so that the fluxes produced in the magnetic core as a result of the magnetomotive forces of said control windings opposite each other, a first one of said control windings being connected to said rectifier means whereby said control winding is energized by the filtered pulsating unidirectional current from said rectifier means, a source of reference voltage connected to said second control winding for the energization thereof whereby a control flux is produced in said magnetic core which is responsive to the difference in magnetomotive forces of said control windings, and a full-wave rectifier having said load windings in alternate rectified circuit portions thereof connected to the terminals of said generator, the unidirectional current output terminals of said full-wave rectifier being connected to the excitation circuit of said generator whereby the excitation of the generator is varied responsively to the difference in magnetomotive forces of said control windings.

6. A voltage regulating system for an alternating current generator having a unidirectional current excitation circuit comprising, phase shifting means including a resistor and capacitor in series connected to the output terminals of said generator, full-wave rectifier means connected in shunt with said capacitor for deriving a pulsating unidirectional current responsive to the output voltage of said generator and shifted in phase therefrom, filter means connected to said rectifier means for filtering said pulsating unidirectional current, a self-saturating magnetic amplifier comprising a closed three-legged magnetic core, a pair of load windings positioned respectively on the outer legs of said core and a pair of control windings positioned in flux opposition on the center leg of said core, a first one of said control windings being connected to said rectifier means whereby said first control winding is energized by the filtered pulsating unidirectional current from said rectifier means, a source of reference voltage connected to said second control winding for the energization thereof, a control flux being produced in said magnetic core which is responsive to the difference in magnetomotive forces of said control windings, a bridge type full-wave rectifier having said load windings in alternate rectified circuit portions thereof connected to the terminals of said generator, the unidirectional current output terminals of said bridge type rectifier being connected to the excitation circuit of said generator, the excitation of said generator being varied responsively to variations in the current in said first control winding to maintain the generator terminal voltage at a predetermined value, and an adjustable resistor in circuit with said first control winding to vary the current in said first control winding in order to adjust the generator terminal voltage maintained by the voltage regulating system.

7. A voltage regulating system for an alternating current generator having a unidirectional current excitation circuit comprising, phase shifting means including a resistor and a capacitor connected in series to the output terminals of said generator, rectifier means connected in shunt with said capacitor for deriving a pulsating unidirectional current responsive to the output voltage of said generator and shifted in phase therefrom, the amount of such phase shift and the magnitude of said current varying inversely with variations in the frequency of said generator voltage, filter means connected to said rectifier means for filtering said pulsating unidirectional current, a self-saturating magnetic amplifier comprising a three-legged magnetic core, a pair of load windings positioned respectively on the outer legs of said core and a pair of control windings positioned in flux opposition on the center leg of said core, the flux produced in said core by said load windings varying directly in the amount of phase shift with variations in the frequency of said generator voltage, whereby the saturating point of said core during each half cycle of said alternating current is also varied, a first one of said control windings being connected to said rectifier means whereby said control winding is energized by the filtered pulsating unidirectional current from said rectifier means, a source of reference voltage connected to said second control winding for the energization thereof whereby a control flux is produced in said core which is responsive to the differences in magneto-motive forces of said control windings, said control flux varying inversely in magnitude and amount of phase shift with frequency changes in said generator voltage whereby to counteract the effect of such frequency changes on the core saturating time produced by the shift in phase of the flux resulting from said load windings, and a bridge type full-wave rectifier having said load windings in alternate rectified circuit portions thereof connected to the terminals of said generator, the unidirectional current output terminals of said full-wave rectifier being connected to the excitation circuit of said generator.

8. A voltage regulating system for an alternating current generator comprising phase shifting means connected to the terminals of said generator, means including a rectifier connected to said phase shifting means for deriving a pulsating unidirectional current responsive to the alternating voltage of said generator and shifted in phase therefrom, a self-saturating magnetic amplifier having two load windings and at least one control winding on a common magnetic core, said control winding connected to be energized by said pulsating unidirectional current, and a full-wave rectifier having said load windings in alternate rectified circuit portions thereof connected to the terminals of said generator, the unidirectional current output of said full-wave rectifier being used to supply excitation for said generator, said excitation varying responsively to variations in said pulsating unidirectional current to maintain the terminal voltage of said generator at substantially a predetermined value.

9. A voltage regulating system for an alternating current generator having a unidirectional current excitation circuit comprising, phase shifting means including a resistor and a capacitor connected in series to the output terminals of said generator, rectifier means connected in shunt with said capacitor for deriving a pulsating unidirectional current responsive to the output voltage of said generator and shifted in phase therefrom, the amount of such phase shift and the magnitude of said current being responsive to distortion in the voltage wave of said generator, filter means connected to said rectifier means for filtering said pulsating unidirectional current, a self-saturating magnetic amplifier comprising a three-legged magnetic core, a pair of load windings positioned respectively on the outer legs of said core and a pair of control windings positioned in flux opposition on the center leg of said core, the saturating flux produced in said core by said load windings being responsive to said distortion in said generator voltage wave, a first one of said control windings being connected to said rectifier means whereby said control winding is energized by the unidirectional current from said rectifier means, a source of reference voltage connected to said second control winding for the energization thereof whereby a control flux is produced in said core which is responsive to the differences in magnetomotive forces of said control windings, the variation in said control flux caused by said distortion being opposite in its effect on the output of the magnetic amplifier to the variation caused by said distortion in the saturating flux produced by said load windings, and a bridge type full-wave rectifier having said load windings in alternate rectified circuit portions thereof connected to the terminals of said generator, the unidirectional current output terminals of said full-wave rectifier being connected to the excitation circuit of said generator.

10. A voltage regulating system for an alternating current generator having an inductive unidirectional current excitation circuit comprising, phase shifting means including a resistor and capacitor in series connected to the output terminals of said generator, full-wave rectifier means connected in shunt with said capacitor for deriving a pulsating unidirectional current responsive to the output voltage of said generator and shifted in phase therefrom, filter means connected to said rectifier means for filtering said pulsating unidirectional current, a self-saturating magnetic amplifier comprising a closed three-legged magnetic core, a pair of load windings positioned respectively on the outer legs of said core and a pair of control windings positioned in flux opposition on the center leg of said core, a first one of said control windings being connected to said rectifier means whereby said first control winding is energized by the filtered pulsating unidirectional current from said rectifier means, a source of reference voltage connected to said second control winding for the energization thereof, a control flux being produced in said magnetic core which is responsive to the difference in magnetomotive forces of said control windings, and a second full-wave rectifier connected to said source of alternating current, said second rectifier having alternate rectified circuit portions for allowing current to pass in opposite directions therethrough from said source, unidirectional current output terminals comprising midpoints in said parallel circuits across which there is normally zero alternating potential, both such parallel circuits containing a half-wave rectifier in the portion on either side of the midpoint, and one said parallel circuit including one of the load windings of said magnetic amplifier in the portion on either side of the midpoint, the unidirectional current output terminals of said second full-wave rectifier being connected to the excitation circuit of said generator whereby a pulsating unidirectional current is produced in said excitation circuit which is responsive to variations in the current in said first control winding, a component of said excitation current resulting from the inductive effect of said excitation circuit flowing through the other parallel circuit during a portion of each half cycle of said generator voltage.

11. A magnetic amplifier circuit comprising, a saturable magnetic core having a control winding and two load windings thereon, a source of alternating current electrical energy, phase shifting means connected to said source, rectifying means connected to said phase shifting means for deriving from said alternating current a pulsating unidirectional current which is shifted in phase from said alternating current, means connecting said control winding for energization by said pulsating unidirectional current, and a bridge type full-wave rectifier connected to said source having said load windings connected in alternate rectified circuit portions thereof.

12. A magnetic amplifier circuit comprising, a saturable magnetic core having a control winding and two load windings positioned thereon, a source of alternating current electrical energy, phase shifting means connected to said source comprising a resistor and a capacitor in series, rectifying means connected in shunt with said capacitor for deriving from said alternating current a pulsating unidirectional current which is shifted in phase from said alternating current, filter means connected to said rectifying means, means connecting said control winding to said filter means whereby the filtered pulsating unidirectional current output of said rectifying means energizes said control winding, and a bridge type full-wave rectifier connected to said source having said load windings connected in alternate rectified circuit portions thereof.

13. In combination, a magnetic amplifier circuit comprising a saturable magnetic core having two load windings and at least one control winding, a pair of conductors for receiving an alternating current, a full-wave bridge type rectifier connected across said conductors and having each of said load windings connected in a respective alternate rectified circuit portion thereof, said load windings being arranged on said core so that the unidirectional components of magnetic flux produced in said core by current in said load windings pass through said control winding in mutually additive relation, phase shifting rectifying means connected between said conductors and said control winding for supplying a phase shifted pulsating unidirectional signal current through said control winding, and a dynamoelectric machine having a field winding connected to be energized by the unidirectional current output of said bridge rectifier.

14. A magnetic amplifier circuit suitable for use in voltage or frequency regulators comprising, a pair of conductors for receiving alternating electric energy whose voltage or frequency is to be regulated, a saturable magnetic core having two load windings and at least one control winding, rectifier means connected between said conductors and said control winding for delivering pulsating unidirectional current to said control winding derived from said alternating electric energy, phase shifting means in circuit relation with said control winding and said rectifier means, a bridge type full-wave rectifier connected across said conductors and having each of said load windings connected in a different alternate rectified circuit portion thereof, and a load circuit connected to receive the unidirectional current output of said bridge type rectifier, said load circuit current being responsive to variations of voltage or frequency of alternating electric energy supplied to said conductors.

15. A magnetic amplifier circuit comprising, a generator of alternating electric energy, means including a magnetic excitation field winding for controlling the electric characteristics of the alternating electric energy produced by said generator, a saturable magnetic core having two load windings and at least one control winding, phase shifting means connected to receive said alternating electric energy, rectifier means connected in circuit with said phase shifting means and said control winding for delivering to said control winding a pulsating phase-shifted unidirectional current derived from said alternating electric energy, and a bridge type full-wave rectifier connected to rectify said alternating electric energy and having said load windings connected in the alternate rectified circuit portions thereof, said magnetic excitation field winding being connected to be energized by the unidirectional current output of said bridge type rectifier.

16. In combination, a source of alternating voltage; frequency responsive phase shifting means connected to said source for deriving from said source voltage two alternating signals respectively shifted in phase from said source voltage by an amount determined by the frequency of said source voltage; a magnetic amplifier comprising a magnetic core, a pair of load windings positioned on said core, a pair of control windings positioned in flux opposition on said core and a bridge type full-wave rectifier connected to said source and having said load windings connected in alternate rectified circuit portions thereof; and a rectifier connected between each control winding and said phase shifting means for delivering to each control winding pulsating unidirectional current derived from a respective one of said phase shifted signals, the unidirectional current output of said full-wave rectifier of said magnetic amplifier being responsive to variations in frequency of said source voltage.

17. A frequency regulator comprising, a generator of alternating electric energy; a motor driving said generator and having a speed controlling field winding; a self-saturating magnetic amplifier comprising a closed three-legged magnetic core, a pair of load windings positioned respectively on outer legs of said core, a pair of control windings positioned in flux opposition on a central leg of said core, and a bridge type full-wave rectifier connected to rectify said alternating electric energy and having each of said load windings connected in a different alternate rectified circuit portion thereof; phase shifting means connected to receive said alternating electric energy for deriving a pair of alternating electric signals shifted in phase relative to the phase of said generated electric energy; a pair of rectifier means connected in circuit with said phase shifting means and each of said control windings for supplying pulsating unidirectional current to each of said control windings derived from a different one of said phase shifted signals; and said motor field winding being connected to be energized by the unidirectional current output of said bridge type rectifier whereby the speed of said motor varies in response to a change in frequency of said alternating electric energy.

18. A magnetic amplifier circuit comprising a saturable magnetic core having two load windings and a control winding, a pair of conductors for receiving an alternating current, a full-wave bridge type rectifier connected across said conductors and having each of said load windings in a respective alternate rectified circuit portion thereof, and phase shifting and rectifying means connected in circuit with said control winding across said conductors for delivering to said control winding pulsating unidirectional current shifted in phase relative to an alternating current supplied to said conductors.

19. A magnetic amplifier circuit comprising a pair of conductors for connection to an alternating current source, a saturable magnetic core having a load winding and a control winding, an output circuit including said load winding and a rectifier connected in series between said conductors, and phase-shifting and rectifying means connected in circuit with said control winding between said conductors for delivering a pulsating unidirectional current to said control winding shifted in phase relative to an alternating current supplied to said conductors.

20. The magnetic amplifier circuit of claim 19 wherein the control winding is wound in a direction to produce flux in said core opposing that of said load winding, and the phase shifting and rectifying means is constructed to supply rectified current to said control winding out-of-phase with the rectified current in said output circuit.

21. The magnetic amplifier circuit of claim 19 wherein the control winding is wound in a direction to produce flux in said core aiding that of said load winding, and the phase-shifting and rectifying means is constructed to supply rectified current to said control winding out-of-phase with the rectified current in said output circuit.

References Cited in the file of this patent

UNITED STATES PATENTS

| Number | Name | Date |
|---|---|---|
| 2,525,451 | Graves | Oct. 10, 1950 |
| 2,529,450 | Hornfeck | Nov. 7, 1950 |

FOREIGN PATENTS

| Number | Country | Date |
|---|---|---|
| 589,341 | Great Britain | June 18, 1947 |
| 56,931 | Netherlands | Sept. 15, 1944 |